(12) United States Patent
Larsson et al.

(10) Patent No.: US 10,034,278 B2
(45) Date of Patent: Jul. 24, 2018

(54) METHOD AND DEVICE FOR HANDLING DIFFERENT DCI MESSAGES IN A WIRELESS NETWORK NODE OF A CELLULAR COMMUNICATION SYSTEM PROVIDING MULTIPLE BANDWIDTHS

(71) Applicant: Telefonaktiebolaget L M Ericsson (publ), Stockholm (SE)

(72) Inventors: Daniel Larsson, Vallentuna (SE); Havish Koorapaty, Saratoga, CA (US); Jung-Fu Cheng, Fremont, CA (US); Robert Baldemair, Solna (SE); Mattias Frenne, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/892,372

(22) PCT Filed: May 21, 2013

(86) PCT No.: PCT/SE2013/050579
§ 371 (c)(1),
(2) Date: Nov. 19, 2015

(87) PCT Pub. No.: WO2014/189418
PCT Pub. Date: Nov. 27, 2014

(65) Prior Publication Data
US 2016/0128033 A1    May 5, 2016

(51) Int. Cl.
*H04W 4/00* (2018.01)
*H04W 72/04* (2009.01)
(Continued)

(52) U.S. Cl.
CPC ......... *H04W 72/042* (2013.01); *H04W 28/20* (2013.01); *H04W 72/0453* (2013.01); *H04W 72/1263* (2013.01)

(58) Field of Classification Search
None
See application file for complete search history.

(56) References Cited

U.S. PATENT DOCUMENTS

| 2007/0133458 A1* | 6/2007 | Chandra | ............... H04L 1/0025 |
| | | | 370/329 |
| 2010/0040009 A1* | 2/2010 | Gaal | ..................... H04W 28/26 |
| | | | 370/329 |

(Continued)

FOREIGN PATENT DOCUMENTS

GB        2455056 A       6/2009

OTHER PUBLICATIONS

Author Unknown, "Technical Specification Group Radio Access Network; Evolved Universal Terrestrial Radio Access (E-UTRA); Physical layer procedures (Release 11)," Technical Specification 36.213, Version 11.2.0, 3GPP Organizational Partners, Feb. 2013, 173 pages.

(Continued)

*Primary Examiner* — Bob Phunkulh
(74) *Attorney, Agent, or Firm* — Withrow & Terranova, PLLC

(57) ABSTRACT

The disclosure relates to a method of transmitting downlink control signalling in a wireless network node of a cellular communication system, when the node provides more than one transmission bandwidth. In particular it relates to a method in a wireless network node of a cellular communication system for transmitting downlink control signalling to at least one wireless device. The wireless network node operates over at least two different transmission bandwidths. The method comprises transmitting information about at least one of the transmission bandwidths to wireless devices in the cellular communication system, configuring properties of at least one downlink control message, to represent one of the at least two different transmission bandwidths and transmitting the at least one downlink control message to the at least one wireless device in the cellular communication system.

23 Claims, 10 Drawing Sheets

(51) Int. Cl.
*H04W 28/20* (2009.01)
*H04W 72/12* (2009.01)

(56) References Cited

U.S. PATENT DOCUMENTS

| | | | |
|---|---|---|---|
| 2011/0080883 A1* | 4/2011 | Prakash | H04L 1/0026 |
| | | | 370/329 |
| 2011/0255485 A1 | 10/2011 | Chen et al. | |
| 2011/0261740 A1 | 10/2011 | Loc et al. | |
| 2012/0009923 A1* | 1/2012 | Chen | H04L 5/0053 |
| | | | 455/434 |
| 2012/0213186 A1* | 8/2012 | Ng | H04L 5/0023 |
| | | | 370/329 |
| 2012/0243499 A1* | 9/2012 | Moon | H04L 5/001 |
| | | | 370/329 |
| 2012/0275428 A1 | 11/2012 | Feng et al. | |
| 2013/0100900 A1 | 4/2013 | Lee et al. | |

OTHER PUBLICATIONS

International Search Report and Written Opinion for U.S. Patent Application No. PCT/SE2013/050579, dated Mar. 27, 2014, 9 pages.

* cited by examiner

METHOD AND DEVICE FOR HANDLING DIFFERENT DCI MESSAGES IN A WIRELESS NETWORK NODE OF A CELLULAR COMMUNICATION SYSTEM PROVIDING MULTIPLE BANDWIDTHS

This application is a 35 U.S.C. § 371 national phase filing of International Application No. PCT/SE2013/050579, filed May 21, 2013, the disclosure of which is incorporated herein by reference in its entirety.

TECHNICAL FIELD

The disclosure relates to a method of transmitting downlink control signalling in a wireless network node of a cellular communication system, when the node provides more than one transmission bandwidth. The disclosure further relates to a wireless device as well as to a method of receiving downlink control signalling in a wireless device.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

For LTE to be turned into practice in an efficient manner it was decided that LTE support six different transmission bandwidths or system bandwidths, which are 1.4, 3, 5, 10, 15 and 20 MHz. This decision was made to be able to set requirements on the user equipments, UE:s, and network nodes in an efficient manner. At the time of decision it was found that these six transmission bandwidths would cover sufficiently most operator's spectrum allocations.

In addition, the LTE Rel-10 specifications of the 3GPP standard have recently been standardized, supporting aggregation of Component Carriers, CC. The Rel-10 standard support up to five aggregated carriers where each carrier is limited in the RF specifications to have a one of six bandwidths namely 6, 15, 25, 50, 75 or 100 resource blocks (corresponding to 1.4, 3, 5, 10, 15 and 20 MHz respectively). Carrier aggregation can in some cases also be used as a tool to allow different bandwidth sizes apart from the standardized transmission bandwidths. FIG. 2a shows a spectrum 200 comprising two aggregated transmission bands 200a and 200b (or carriers) of 5 Mz and 3 MHz. For example is it possible to allocate a channel bandwidth of 8 MHz by combining a 5 and 3 MHz carrier to a specific terminal, as disclosed in FIG. 2a.

An operator may own a contiguous section of spectrum that does not match any of the existing channel bandwidths in LTE. However, e.g. depending on the operator's spectrum size it may not be feasible to rely on carrier aggregation as a solution to utilise the complete spectrum. The operator could then make the choice to deploy a different LTE carrier, which is different from the (at least up to release 11) supported LTE bandwidths, e.g. 7 MHz, for UE:s supporting such a solution and continue to operate e.g. a 5 MHz carrier for those UE:s that do not support 7 MHz. However, one must appreciate that there will always be a number of legacy terminals in the system. An option would then be to provide different transmission bandwidths for different UE:s.

However, it is a general problem to perform scheduling and demodulation on a carrier, where the transmission bandwidth is different for different UE:s. The different bandwidths create a problem since the Downlink Control Information, DCI, payload depends on the bandwidth of the carrier and if a user equipment assumes the wrong bandwidth it is unable to decode the DCI message Furthermore, in some cases the transmission bandwidth does also impact the physical location or mapping, of the uplink control signaling which would be located at different location in frequency depending on which transmission bandwidth is used. This may also create problems for the UE not knowing which location to use.

Hence, the existing solutions are not well adapted for a system where different UE:s, e.g. legacy and new UE:s, see different transmission bandwidths.

SUMMARY

This disclosure provides a method for providing a system where User Equipments using different channel bandwidths can operate in a resource efficient way, e.g. by letting user equipments operating on different bandwidths use the same common search space for control signalling. This is accomplished by letting different Downlink Control Information, DCI, messages configurations correspond to different transmission bandwidths.

According to the disclosure it provides for a method in a wireless network node of a cellular communication system for transmitting downlink control signalling to at least one wireless device, wherein the wireless network node is operating over at least two different transmission bandwidths. The method comprises: transmitting information about at least one of the transmission bandwidths to wireless devices in the cellular communication system, configuring properties of at least one downlink control message, to represent one of the at least two different transmission bandwidths and transmitting the at least one downlink control message to the at least one wireless device in the cellular communication system. According to one aspect of the disclosure, the wireless network node provides at least one common "common search space" for control signalling, which is common for the at least two transmission bandwidths.

The disclosure provides a resource efficient way of operating multiple system bandwidths that may overlap with each other, because the network is able to reuse resources among different UE:s independent of the system bandwidth assumption made by each UE. This technique allows operators to expand their spectrum utilization without affecting the operation of legacy UE:s that are already being supported on the spectrum. This can be beneficial to operators in expanding their services while maintaining backward compatibility.

According to one aspect of the disclosure, the at least one downlink control message is configured to represent the transmission bandwidth used for encoding the at least one downlink control message. By letting the properties of the downlink control message correspond to the used bandwidth used for encoding, decoding is facilitated, because the decoder knows which bandwidth to assume.

According to one aspect of the disclosure, it relates to a wireless network node being configured to transmit downlink control signalling to at least one wireless device in a cellular communication system. The wireless network node is operating over at least two different transmission bandwidths. The wireless network node comprises a processing circuit configured to configure the properties of at least one downlink control message, to represent one of the at least two different transmission bandwidths and a communication unit, adapted to transmit information about at least one of the available transmission bandwidths to wireless devices in the cellular communication system and to transmit the at least one downlink control message to the at least one wireless device.

According to one aspect of the disclosure, it relates to a computer program, comprising computer readable code which, when run on a wireless network node in a cellular communication system, causes the node to perform the method as described above.

According to one aspect of the disclosure, it relates to a method in a wireless device of receiving downlink control signalling in a cellular communication system. The method comprises retrieving information about transmission bandwidths available in the cellular communication system and receiving at least one downlink control message from the cellular communication system and determining, based on properties of the at least one received downlink control message, which of the available transmission bandwidths is represented by the at least one downlink control message. The wireless device is then able to in an easy way detect the correct bandwidth, even if several different transmission bandwidths are provided by a node or access point in a geographical area (or cell).

According to one aspect of the disclosure, the method further comprises decoding the downlink control message assuming the determined bandwidth. According to one aspect of the disclosure, the method further comprises using the determined transmission bandwidth when sending a signal or message triggered by the downlink control message. Hence, blind decodes and other uncertainties relating to the bandwidth are avoided.

According to one aspect of the disclosure, it relates to a wireless device being configured to receive downlink control signalling in a cellular communication system. The wireless device comprises a network communication unit, configured to retrieve information about transmission bandwidths available in the cellular communication system and receive at least one downlink control message from the cellular communication system. The wireless device further comprises a processing circuitry configured to determine, based on properties of the at least one received downlink control message, which one of the available transmission bandwidths is represented by the at least one downlink control message. Hence, the wireless device is configured to perform the method in a wireless device described above.

According to one aspect of the disclosure, it relates to a computer program, comprising computer readable code which, when run on a wireless device in a cellular communication system, causes the wireless device to perform the method as described above.

With the above description in mind, the object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The general idea is to let a wireless access point in a wireless communication system transmit different downlink control messages being dependant on the transmission bandwidth (also referred to as system bandwidth) used when encoding the control messages. Thereby, a receiving User Equipment, UE, may easily determine which bandwidth to assume in order to decode and interpret the control information and/or to respond to the control message. Hence, blind decoding attempts and other bandwidth related uncertainties are avoided.

Embodiments of the present disclosure relate, in general, to the field of downlink control signalling in LTE. However, it must be understood that the same principle is applicable in other wireless systems, where the transmission bandwidth of the system is different for different UE:s served and where the control signalling is somehow affected by the transmission bandwidth.

Figure 1:
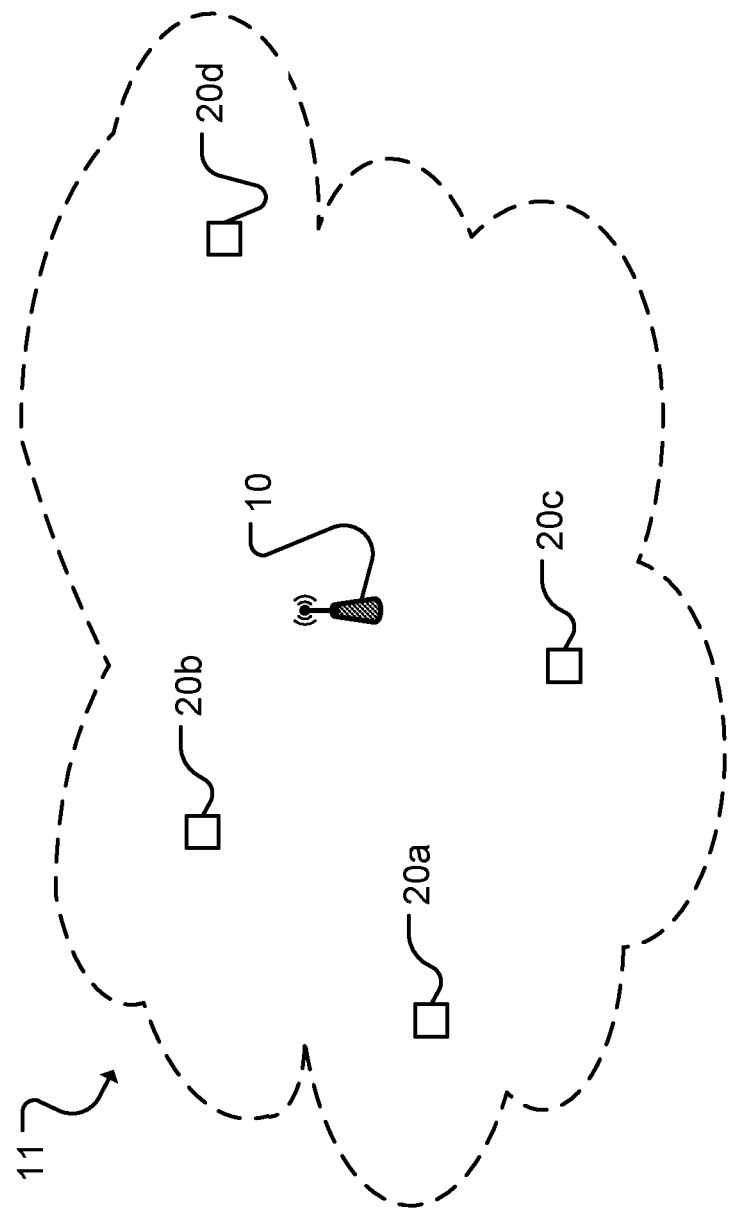
FIG. 1 illustrates a cell of a cellular communication system.

FIG. 1 illustrates a cell 11 of a cellular communication system, where the proposed technique may be implemented comprising a wireless network node 10. The wireless network node is an Evolved NodeB, eNB, which is connected to a cellular communications network which is not shown. The eNB controls a geographical area also referred to as a cell 11. Four UE:s, 20a-d, are connected to the ENodeB.

As mentioned above, LTE (at least up to version 11) supports only six different transmission bandwidths, which are 1.4, 3, 5, 10, 15 and 20 MHz. This implies that radio-frequency requirements are only specified for these bandwidths. However, in practice additional transmission bandwidths can be introduced by updating the radio specifications.

In an illustrative example of where the proposed technique is applicable, we assume that an operator of the eNB owns 7 MHz of frequency spectrum and that the operator deployed LTE within the spectrum. To utilize as much as possible of the spectrum the operator most likely deployed a 5 MHz band. Now the operator would like to utilize the remaining part 2 MHz of spectrum the operator owns. The operator could change its spectrum usage to aggregate 3+3 MHz. However, it would be likely that the existing UE:s operating on the 5 MHz system currently do not support 3 MHz bandwidth and are not capable of carrier aggregation to aggregate 3+3 MHz. Furthermore, the existing users would then see a clear reduction in performance, which is a problem.

According to the proposed technique, the operator could then make the choice to deploy different transmission bandwidths to different UE:s. For example, it may operate a 7 MHz LTE band for UE:s supporting 7 MHz and continue to operate a 5 MHz band for those UE:s that do not support 7 MHz. Such a solution would require an update to the LTE radio specifications. However, legacy UE:s would still be supported. In the following the terms band often refers to a carrier and is not restricted to the definition in the LTE standard where band typically refers to different spectrum regions. Hence, frequency bands may as well be overlapping.

Figure 2A:
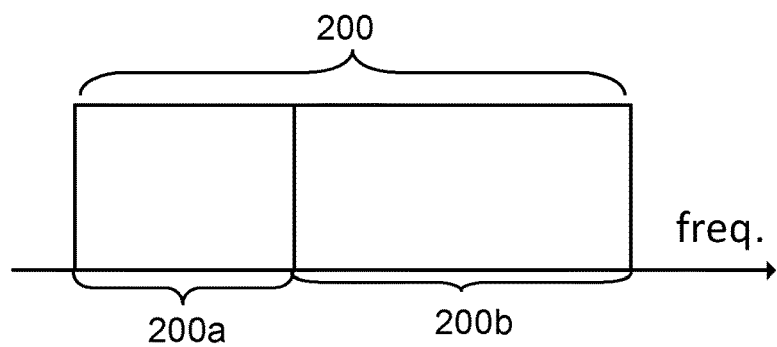
FIG. 2a illustrates carrier aggregation.
Figure 2B:
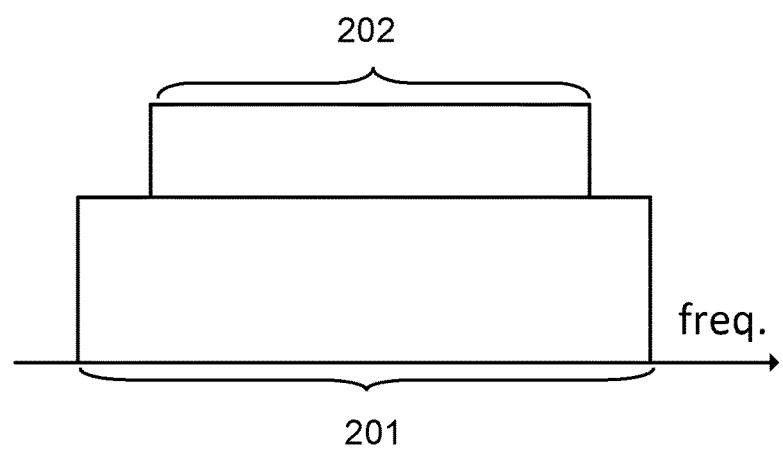
FIGS. 2b and 2c illustrates two different transmission bands having different transmission bandwidths.
Figure 2C:
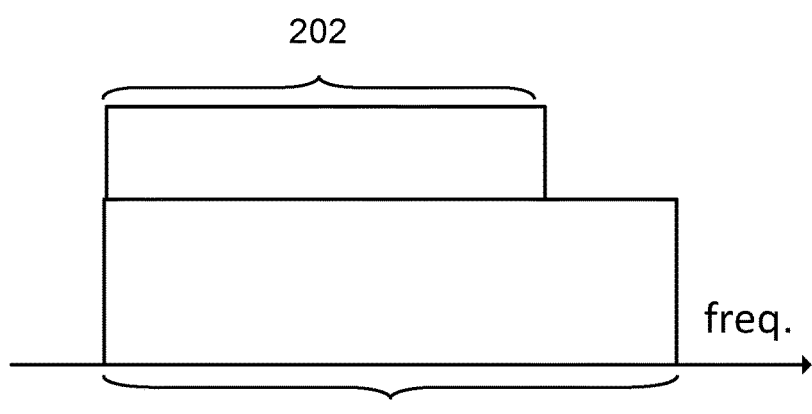

From the eNB side, the eNBs transmissions of different bands in the frequency domain are illustrated in FIGS. 2b and 2c. The first band 201 has a transmission bandwidth corresponding to the full spectrum available to the operator, which is 7 MHz in this case. The second band 202 corresponds to one of the available transmission bandwidths, which in this case is 5 MHz. In the first example the two transmission bands are centralized. FIG. 2c illustrates the same bandwidths, where the second band is not centralized with the first band.

Another reason why the system bandwidths can differ among different UE:s is the support of Machine Type Communication, MTC, UE:s, wherein an MTC UE supports a smaller system bandwidth than the "ordinary" UE:s operating on the same LTE carriers.

However, if the operator deploys a system in the above way where different UE:s, e.g. legacy and new UE:s, see different system bandwidths, then there are some scheduled messages that are common among legacy UE:s and new UE:s. Such messages could for example be part of the system information, paging and/or random access response messages. In a legacy system, the payload size of a Downlink Control, DCI, message depends on the system BW. Hence, for a UE it may be a problem not knowing what transmission bandwidth the UE should assume for a certain DCI message. The reason is that different system BW assumptions affect the size of the DCI message and also where in the frequency domain the scheduled, Physical Downlink Shared Channel, PDSCH/Physical Uplink Shared Channel, PUSCH is located and which sequence is applied to the corresponding reference signals. Hence, with the configuration of messages of the present specifications a carrier of 7 MHz only works for new terminals supporting 7 MHz. Old terminals cannot operate, not even on a 5 MHz part.

One possibility would be to provide separate common search spaces, for each bandwidth. Though, the utility of having a separate common search spaces on the Physical Downlink Common Control Channel, PDCCH, for each bandwidth is small and it will create additional overhead.

In this application the term wireless device is generally used. A wireless device, or user equipment, UE, which is the term used in the 3GPP specifications, referred to in this application could be any wireless device capable of communicating with a wireless network. Examples of such devices are of course mobile phones, smartphones, laptops and Machine to Machine, M2M, devices etc. However, one must appreciate that capability to communicate with a wireless network could be built in almost any device e.g. a car, a lamp post, a scale and so on.

Cell in this application refers to a geographical area controlled by a wireless network node. Hence, the cell corresponds to the coverage area of a wireless network node. According to the proposed technique, in the cell, carriers with one or several transmission bandwidths can be received.

Transmission bandwidth is the radio frequency bandwidth in which signals between the BS and UE are exchanged.

In a Time division duplex system the carrier is shared by uplink and downlink. However, in frequency division duplex different carriers are used for uplink and downlink. Then there is one transmission bandwidth for the uplink and one for the downlink, which is not necessary equal. Then the downlink control message may represent either the uplink or downlink transmission bandwidth depending on the application.

Note that for a UE, the instantaneous bandwidth may vary and a UE may be allocated only a part of the total available transmission bandwidth. The rest of the bandwidth may be allocated to other UE:s in the cell.

Messages transmitted over a radio link to UE:s in a cellular communication system can be broadly classified as control messages or data messages. Control messages are used to facilitate proper operation of the system as well as proper operation of each UE within the system. Control messages could include commands to control functions such as the transmitted power from a UE, signalling of resource blocks, within which the data is to be received by the UE or transmitted from the UE and so on.

Figure 3:
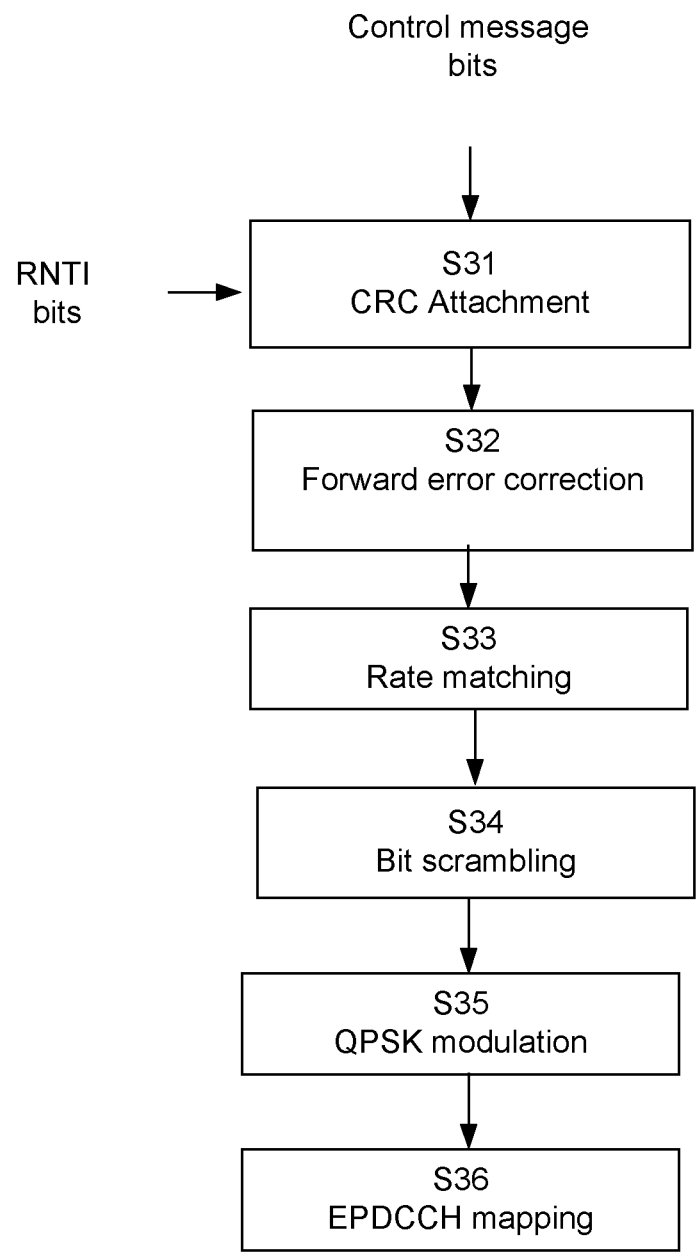
FIG. 3 is a flow chart illustrating the control message configuration process.

An overview of the steps performed when configuring a downlink control message for transmission on the Enhanced Physical Downlink Control Channel, EPDCCH, is illustrated in FIG. 3. The EPDCCH is described in further detail in connection with FIGS. 6 and 7.

The control message carried by the EPDCCH is referred to as downlink control information, DCI. Several different formats and corresponding lengths of DCI are defined in LTE: 0, 1, 1A, 1B, 1C, 1D, 2, 2A, 2B, 2C, 2D, 3, 3A and 4. For a given DCI format, the length may vary based on what system bandwidth is assumed. Each DCI message comprises a number of control message bits. The bits comprise control information that needs to be delivered to one or several other nodes in the cellular communication system.

A 16-bit cyclic-redundancy check, CRC, checksum is first computed from the bits. The CRC bits are scrambled by the Radio Network Temporary Identifier, RNTI, identifying the one or more wireless devices to which the control message is addressed. The scrambling process is done by bit-wise eXclusive OR, XOR, of the CRC bits and a mask derived from the RNTI bits. The scrambled CRC bits are attached to the end of the control message bits, step S31.

These bits are then encoded by a forward error correction code, step 32, which, in LTE, is based on a rate 1/3 tail-biting convolutional code. Since the encoded and CRC protected DCI messages as well as EPDCCH have different sizes, a rate matching step S33 is employed to puncture or repeat the encoded bits to fit the available size of the EPDCCH. The rate matched coded bits are further scrambled S34 by a UE-specific or cell-specific sequence to provide protection against inter-cell interference. The output bits are then mapped to QPSK symbols, S35. The QPSK symbols are mapped or scheduled, S36, according to EPDCCH procedures described below.

It is a general problem to perform scheduling and demodulation on a carrier where the bandwidth of the carrier is different for different UE:s served by the network. This creates a problem since the DCI payload depends on the bandwidth of the carrier and if the UE assumes the wrong bandwidth it is unable to decode the DCI message.

Figure 4:
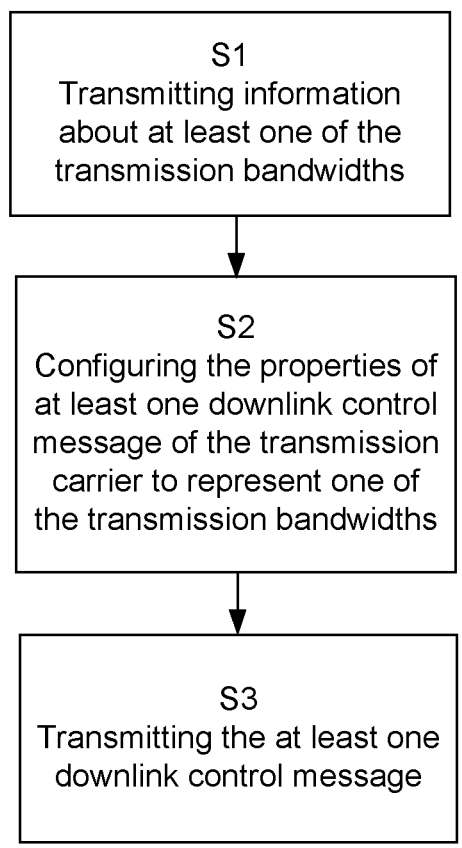
FIG. 4 is a flow chart illustrating a method of providing downlink control signalling in a network node according to an exemplary embodiment of the present disclosure.

In FIG. 4 the method in a wireless network node of a cellular communication system for transmitting downlink control signalling to at least one wireless device, where the wireless network node is operating over at least two different transmission bandwidths is disclosed. Different transmission bandwidths imply two different transmission bands (or carriers), having different bandwidths. According to one aspect, the transmission bandwidth may refer to UL or DL bandwidths or a combination thereof.

According to one aspect of the disclosure, the at least two different transmission bands are at least partly overlapping in the frequency domain, as shown in FIGS. 2b and 2c.

In the first step the wireless network node transmits information about at least one of the transmission bandwidths to wireless devices in the cellular communication system. In this step the wireless network node informs wireless devices in the cell about the different transmission bands. According to one aspect the wireless network node only transmits information about the higher or lower bandwidth. Then, it is assumed that the lower or higher bandwidth is already known to the wireless network node. According to another aspect the wireless network node informs about several or all available bandwidths. The information about the different transmission bands may be transmitted at different point in time, which may occur a long time before the following steps are executed. However, the wireless devices need to somehow get information about some or all of the available bands from the wireless network node.

The transmission of information is either performed directly to the wireless devices over the radio interface or indirectly over the cellular communication system. Indirectly implies that the information is sent to the wireless device via one or several other nodes or eNB:s.

In the next step, the wireless network node configures the properties of at least one downlink control message, to represent one of the at least two different transmission bandwidths. This implies that the wireless network node has a number of control message bits comprising control information, to send to at least one wireless device. The wireless network node configures a message, using these bits, as illustrated in FIG. 3. The configuration takes the bandwidth as an input and configures the properties of the message based on the bandwidth, by changing at least one of the steps of the configuration. The control message is configured such that a recipient can determine the bandwidth without decoding the at least one downlink control message. The recipient may e.g. have a mapping table, where different properties e.g. different resource mappings represent different bandwidths.

One may see it as that the recipient may determine the bandwidth by simply "looking" at the signal. Hence, the control information i.e. the control bits are not affected. How, this is possible, will be further explained below.

Finally, the wireless network node transmits S3 the at least one downlink control message to at least one wireless device in the cellular communication system.

As described above, according to one aspect of this disclosure, the wireless network node is configured to operate simultaneously over the at least two different transmission bandwidths, by letting different UE:s, being simultaneously connected to the wireless network node, transmit and receive on different transmission bands.

According to one aspect of this disclosure, the wireless network node provides at least one search space for control signalling, which is common for the at least two transmission bandwidths. This implies that if the operator deploys a system in the above way where different UE:s, see different system bandwidths, then it is still possible to use a common search space for all wireless devices, independent on bandwidth used.

According to one aspect of this disclosure, the at least one downlink control message is configured to represent the transmission bandwidth used for encoding the at least one downlink control message. As stated above the decoding of DCI messages is dependent on the bandwidth, since the DCI payload depends on the bandwidth of the carrier. Hence, by formatting the properties of a downlink control message to correspond to the bandwidth used for encoding, decoding is enabled.

Figure 5:
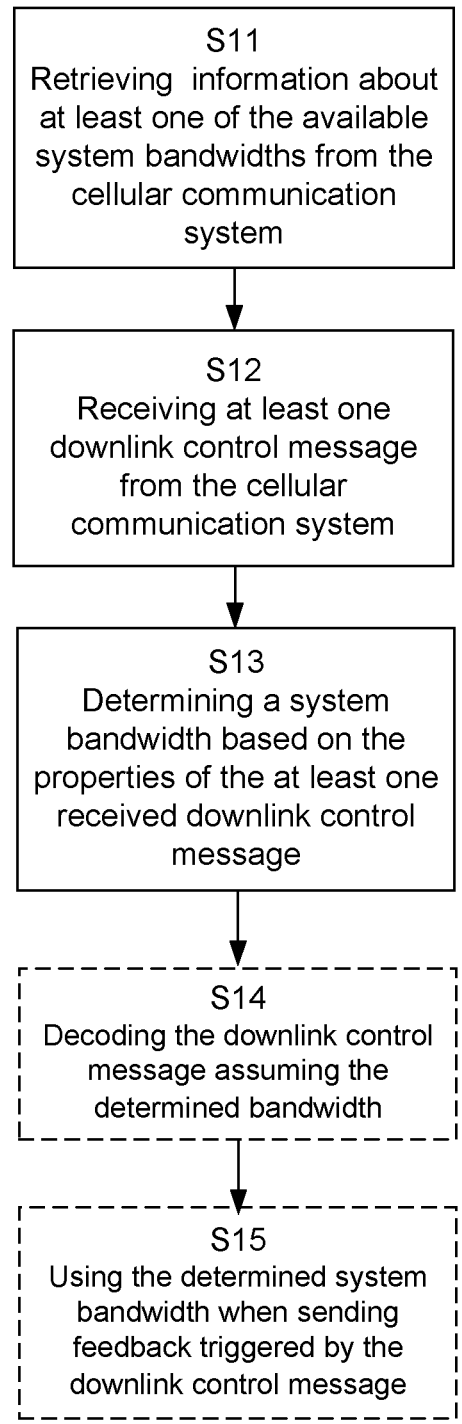
FIG. 5 is a flow chart illustrating a method in a wireless device of receiving downlink control signalling according to an exemplary embodiment of the present disclosure.

The present disclosure further relates to a method in a wireless device of receiving downlink control signalling in a cellular communication system. FIG. 5 is a flow chart illustrating the method in a wireless device of receiving downlink control signalling according to an exemplary embodiment of the present disclosure.

The method is typically performed in a wireless device being configured to operate in a geographical area, here radio-wise covered by a wireless network node, where two different transmission bandwidths are provided by a wireless network node, as described above. The geographical area here covered by a wireless network node is here referred to as a cell.

The method starts with the step of receiving S11 about the available transmission bandwidths in the cellular communication system. The reception of information about the different transmission bands may be done at different point in time, which may occur a long time before the following steps are executed. However, the wireless devices need to somehow get information about available bands from the wireless network node.

The wireless device then receives S12 at least one downlink control message from the cellular communication system. Then the wireless device determines S13 a transmission bandwidth based on the properties of the at least one received downlink control message.

According to one aspect of the disclosure, the wireless device then decodes S14 the downlink control message assuming the determined bandwidth.

According to one aspect of the disclosure, the wireless device uses the determined transmission bandwidth when sending feedback triggered by the downlink control message. Thus, related triggered feedback in uplink or downlink can assume the same system bandwidth as the original DCI message. This would for example impact the location of the Physical Uplink Control CHannel, PUCCH, which is located at different location in frequency depending on which system bandwidth assumption the wireless device makes.

It could further impact the bandwidth assumed for Sounding Reference Signal, SRS, transmission that are triggered by a DCI message wherein for certain DCI message a certain system bandwidth is assumed for the SRS transmission and for other DCI message another system bandwidth is assumed. Another possible impact is the location of the Physical Hybrid Admission Request Indicator Channel, PHICH, wherein it is assumed that the PHICH location is given by the system bandwidth that is associated with PUSCH transmission.

According to another aspect of the disclosure, the UE would assume a different system bandwidth for feedback related transmission than the original transmission, wherein for example PUCCH, SRS or PHICH transmission are associated with a different system bandwidth than the associated transmission.

There exist a number of ways of implementing the proposed techniques of configuring properties of at least one downlink control message, to represent one of the at least two different transmission bandwidths will now be described. It is also possible to combine these for the UE, when determining the system BW to assume when receiving a DCI message.

Within this application, for simplicity in handling the terminology, the legacy UE:s are referred to as UE A and the system they can operate on is referred to as system A. Further, the new larger bandwidth system is referred to as system B which can be operated by UE B. UE B can operate on either system A or B while UE A can only operate on system A.

In LTE, a UE connected to the network is assigned a cell radio network temporary identification (C-RNTI), which is used to address the target of a control message transmission. Furthermore, there are control messages that need to be transmitted to more than one UE or to UE not yet assigned a C-RNTI. For these purposes, there are additional specifically defined RNTIs for use in an LTE network such as those listed in Table 1. The length of the RNTI in LTE is 16 bits.

TABLE 1

List of RNTI usages.

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

According to one aspect of the proposed technique, the step of configuring the properties of the at least one downlink control message comprises, using different wireless device identifiers for configuring the at least one downlink control message for the different transmission bandwidths. According to one particular aspect, the wireless device identifiers are Radio Network Temporary Identifiers.

Hence, in the wireless device, use of different wireless device identifiers for configuring the properties of the at least one downlink control message represent different transmission bandwidths.

As an example, a UE of type B can be made to assume different system BW depending on which RNTI the UE is assuming when decoding the DCI messages. The DCI messages can be transmitted on PDCCH or/and EPDCCH. The CRC of DCI message that the UE receives is scrambled with the RNTI used to address the UE.

Furthermore, the same BW assumption may also apply to transmissions that were at an earlier point of time initiated with a DCI message. Examples of such types of transmissions are Semi-persistent scheduled messages in either UL or DL and transmissions triggered based on HARQ feedback in a PHICH transmission.

An example of this aspect is that the UE B assumes that for messages associated with the C-RNTI, a system B BW should be assumed and for the temporary C-RNTI, SPS-C-RNTI, SI-RNTI, RA-RNTI and P-RNTI the system A BW should be assumed.

Other combinations or divisions of the above example RNTIs into different BW assumptions are possible as well. An implementation of the above example is that the RNTIs are grouped into one or several groups where each group corresponds to a certain BW size. Example of a grouping based on two groups is given down below:
Group 1 (only used for one terminal):
C-RNTI, SPS C-RNTI
Group 2 (used for several terminals):
SI-RNTI, P-RNTI, RA-RNTI, TC-RNTI, TPC-PUSCH-RNTI, TPC-PUCCH-RNTI Each group could also contain other examples of RNTIs. It is further given that for Group 1 the UE B assumes the system BW of system B and for Group 2 RNTIs the UE assumes the system BW of system A. The specific above example would allow UE B UE:s to share DCI messages for system information, paging, random access response, power control with DCI format 3/3a with UE A users which will save overhead in the system.

If there are many UE:s of type B available in the system it may not be necessary to share the same message between UE B and UE A as the messages related to UE B could have different content than messages related to UE:s of type A (since UE of type B belongs to a later release it may have support for more physical layer features or have different content in the broadcast messages). In such a situation, it would then be feasible to configure a UE to be part of a group and/or configure the number of different groups that exist. Which group the RNTI is placed in would then define which system the UE should assume when demodulating the DCI message. The configuration of the groups can be made for example by RRC signaling or MAC signaling.

According to one aspect of the present disclosure, the step of configuring the properties of at least one downlink control message comprises letting different message formats of the downlink control message correspond to different transmission bandwidths. Hence, in the wireless device, different message formats of the received downlink control message correspond to different transmission bandwidths.

As described above, several different formats and corresponding lengths of DCI are defined in LTE: 0, 1, 1A, 1B, 1C, 1D, 2, 2A, 2B, 2C, 2D, 3, 3A and 4. For a given DCI format, the length may vary based on what system bandwidth is assumed. In this variant, it is given that depending on which DCI message type the UE receives, it assumes a different system bandwidth.

One example is that for DCI format 1A/0 and potential 1C the UE assumes a certain system bandwidth A (or B) while for other DCI formats the UE assume a different system bandwidth B (or A) respectively.

According to one aspect of the present disclosure, wherein the step of configuring the properties of at least one downlink control message comprises letting different resource mappings of downlink control message represent different transmission bandwidths. This implies that downlink control messages representing different bandwidths are scheduled such that there is at least some difference in the resource allocation or mapping. Hence, in the wireless device, different scheduling of the downlink control message represents different transmission bandwidths.

For example the UE of type B assumes different BW of the system when receiving DCI message depending on which PDCCH/EPDCCH candidate that the DCI message is associated with. To understand this principle the physical mapping of the Enhanced Physical Downlink Control Channel, EPDCCH, will now be described.

Figure 6A:
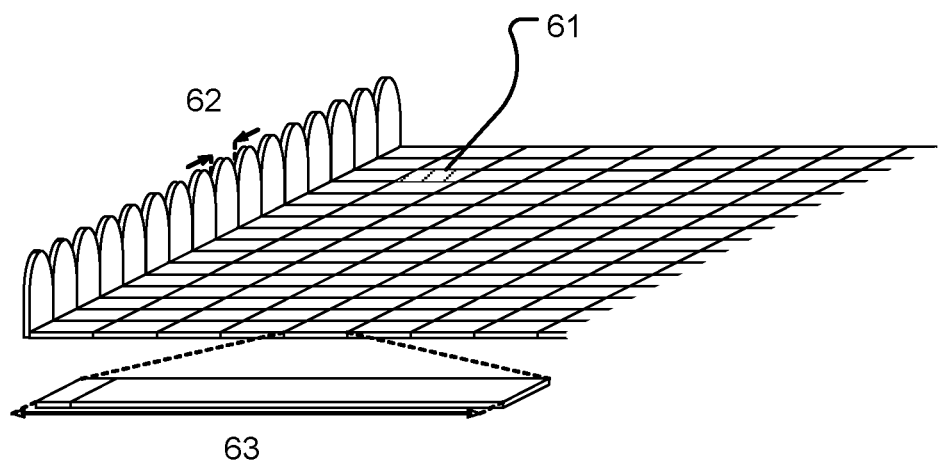
FIG. 6a illustrates the LTE downlink physical resource configuration.

LTE uses Orthogonal Frequency Division Multiplexing, OFDM, in the downlink and DFT-spread OFDM (a.k.a. SC-FDMA) in the uplink. The basic LTE downlink physical resource can thus be seen as a time-frequency grid as illustrated in FIG. 6a, where each resource element 61 corresponds to one OFDM subcarrier 62 during one OFDM symbol interval 63. Furthermore, the resource allocation in LTE is typically described in terms of resource blocks, RB, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks, VRB, and physical resource blocks, PRB, has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain thereby providing frequency diversity for data channel transmitted using these distributed VRBs.

In LTE, downlink transmissions are dynamically scheduled, i.e. in each subframe 63 an eNB transmits control information about to which terminals data is transmitted and upon which resource blocks the data is transmitted, in the current downlink subframe. Control signalling 65 in LTE is illustrated in FIG. 6b.

This control signalling 65 is typically transmitted in the first 1, 2, 3 or 4 OFDM symbols in each subframe and the number n=1, 2, 3 or 4 is known as the Control Format Indicator, CFI. The downlink subframe also contains common reference symbols (CRS) 66, which are known to the receiver and used for coherent demodulation of e.g. the control information. In FIG. 6b, CFI=3 OFDM symbols.

Figure 6B:
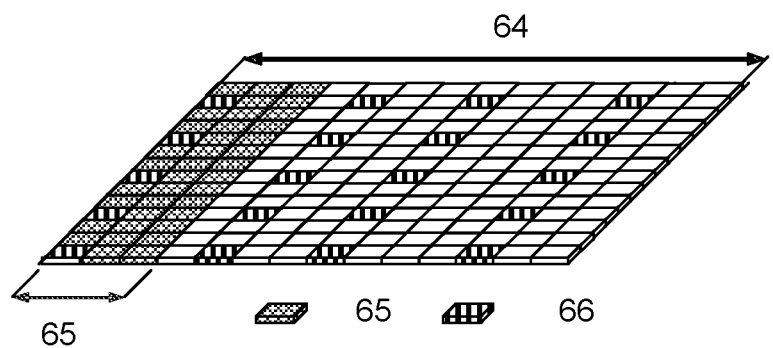
FIG. 6b illustrates the LTE time-domain structure.
Figure 6C:
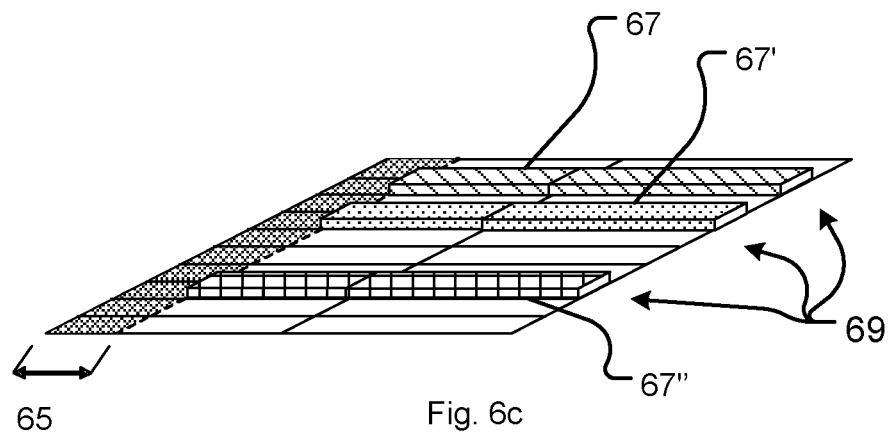
FIG. 6c illustrates the configuration of three Enhanced Physical Downlink Control Channel regions a LTE Downlink subframe.

In LTE release 8, the first one to four OFDM symbols 65, in a sub frame, are reserved to contain control information, see FIG. 6b. Furthermore, in Rel-11, an Enhanced Physical Downlink Control Channel, EPDCCH, was introduced in which PRB pairs are reserved to exclusively contain EPDCCH transmissions, although excluding from the PRB pair the one to four first symbols 65 that may contain control information to UE:s. FIG. 6c illustrates a Downlink subframe showing 10 PRB pairs 69 and configuration of three EPDCCH regions, 67, 67', 67", of size 1 PRB pair each. The remaining PRB pairs can be used for Physical Downlink Shared CHannel, PDSCH, transmissions. Hence, the EPDCCH is frequency multiplexed with PDSCH transmissions contrary to PDCCH which is time multiplexed with PDSCH transmissions. Furthermore, two modes of EPDCCH transmission are supported, the localized and the distributed EPDCCH transmission.

Figure 7A:
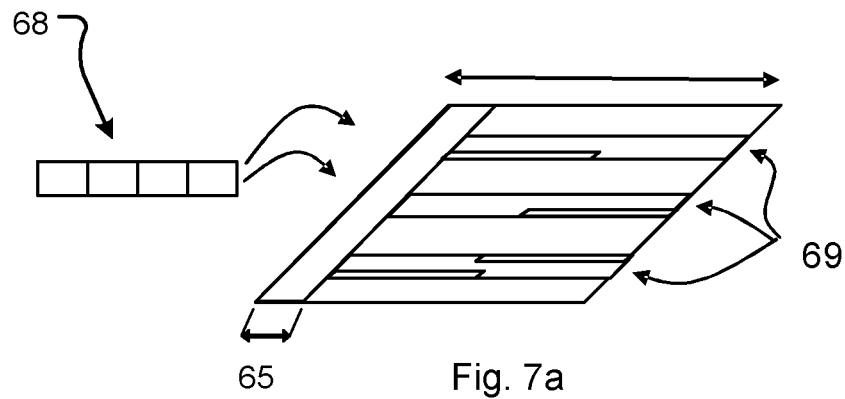
FIG. 7a illustrates a downlink subframe wherein Enhanced Physical Downlink Control Channel is split into four parts, which are mapped to several control regions.

In distributed transmission, an EPDCCH 67 is mapped to resource elements in up to N PRB pairs, where N=2, 4, or 8. These are denoted an EPDCCH set 68. In this way frequency diversity can be achieved for the EPDCCH message. FIG. 7a shows a Downlink subframe, as the one illustrated in FIG. 6c, showing a split of an EPDCCH set 68 into 4 parts or Enhanced control channel element, ECCE, mapped to multiple of the enhanced control regions known as PRB pairs 69, to achieve distributed transmission and frequency diversity.

Figure 7B:
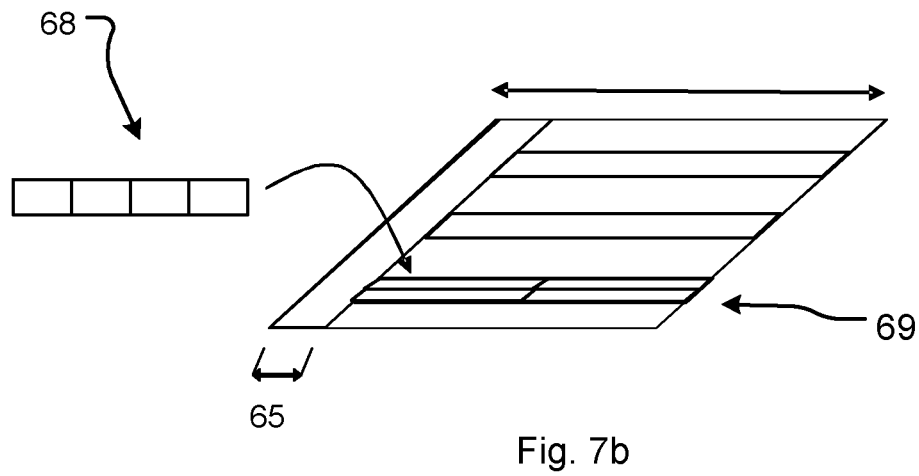
FIG. 7b illustrates a downlink subframe wherein the four parts belonging to an Enhanced Physical Downlink Control Channel is mapped to one of the control regions.

In localized transmission, an EPDCCH set 68 is mapped to one PRB pair only for aggregation level 1, 2 and 4 (see below for discussion on aggregation levels). In case the aggregation level of the EPDCCH is too large, a second PRB pair is used as well, and so on, using more PRB pairs, until all ECCE belonging to the EPDCCH set 68 has been mapped. See FIG. 7b for an illustration of localized transmission. FIG. 7b illustrates a Downlink subframe showing the 4 parts belonging to an EPDCCH is mapped to one of the enhanced control regions 69, to achieve localized transmission.

To facilitate the mapping of ECCEs to physical resources each PRB pair is divided into 16 enhanced resource element groups, eREGs, and each ECCE is split into L=4 or L=8 eREGs for normal and extended cyclic prefix, respectively. An EPDCCH is consequently mapped to a multiple of four or eight eREGs depending on the aggregation level.

Figure 7C:
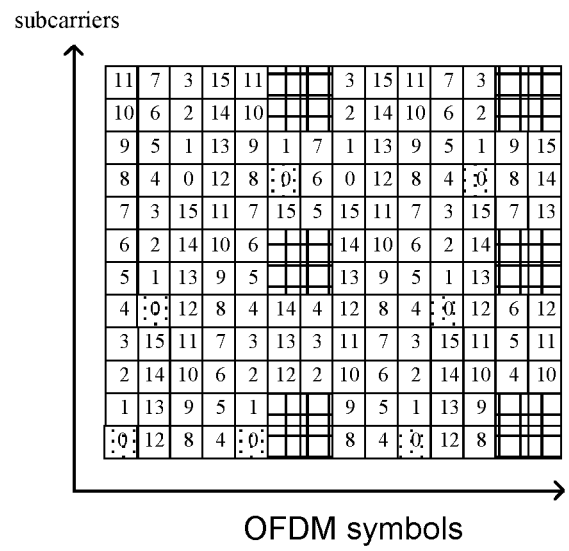
FIG. 7c illustrates a physical resource block pair of normal cyclic prefix configuration in a normal subframe.

These eREG belonging to an EPDCCH reside in either a single PRB pair (as is typical for localized transmission) or a multiple of PRB pairs (as is typical for distributed transmission). The division of a PRB pair into eREGs is illustrated in FIG. 7c. The first ECCE consist of a collection of the RE belonging to eREG 0, 5, 9 and 13. The second ECCE contains eREG 1, 6, 10 and 14 and so on.

FIG. 7c illustrates a PRB pair of normal cyclic prefix configuration in a normal subframe. Each tile is a resource element where the number corresponds to the eREG it is grouped within. The RE with a dotted pattern corresponds to the RE belonging to the same eREG indexed with 0.

The EPDCCH resources are UE specifically configured in terms of EPDCCH sets. An EPDCCH set is a collection of N PRB pairs containing 16N/L ECCE where agreed possible values of N=2, 4, 8. A UE can be configured with K=2 sets simultaneously and the value N can be different for each of the K sets. Each set is also configured to be of either localized or distributed type. For example, a UE may be configured with K=2 and $N_1$=4 and $N_2$=8 where the first set is used for localized transmission and the second for distributed transmission. The total number of blind decodes (32 when uplink MIMO is not configured) is split between the K sets. A UE will monitor $B_i$ EPDCCH candidates in EPDCCH set i and this is given by tables in 3GPP specification 36.213.

Each EPDCCH consists of AL ECCEs where AL is the aggregation level of the message. Each ECCE in turn consists of L eREG where L=4 or L=8. In each PRB pair there are 16 eREG. When an EPDCCH collides in mapping with other signals such as own cell CRS or own cell legacy control region, the other signals have priority and EPDCCH is mapped around these occupied REs and code chain rate matching is applied. This means that the effective number of available RE per eREG is usually less than the 9 RE but there is no interference from these colliding signals introduced in the decoding since the EPDCCH is mapped around those signals.

According to this aspect of the disclosure, the UE of type B assumes different BW of the system when receiving DCI message depending on which PDCCH/EPDCCH candidate that the DCI message is associated with. Further example of this is that depending on which EPDCCH set the candidate is associated to, the UE would assume different bandwidth of the system. Hence, each set is associated with a certain bandwidth and this association could be configured UE specifically by Radio Resource Control, RRC, signaling or could be given by the standard specification. For instance, if the EPDCCH set is signaled with a bitmap or compressed bitmap whose length corresponds to a certain bandwidth in terms of RBs, then the UE should assume that the DCI messages carried by this configured EPDCCH set use the corresponding bandwidth when determining the DCI message payload.

An example of such a division would be as follows. If the candidate belongs to the distributed EPDCCH set, the UE would assume BW according to system A and if the candidate is associated with the localized EPDCCH set, the UE would assume a system BW of system B. The inversion is also a possible example. In a further example the blind decode candidates for a given search space are divided into different groups wherein depending on which group the blind decode is associated with the UE assumes a certain system bandwidth.

In yet another aspect of the disclosure, the UE assumes a certain system bandwidth depending on the subframe in which the blind decode is performed. One possible implementation of this aspect is that the subframes are divided into different groups wherein each group is associated with a certain system bandwidth assumption.

According to one variant of this aspect of the disclosure, the UE of type B assumes different BW sizes for the reception of the DCI message depending on which search space the DCI messages are received in. Hence, in the wireless device, different scheduling of the downlink control message in different search spaces represents different transmission bandwidths.

Enhanced Physical Downlink Control Channel, EPDCCH, link adaptation and search space will now be briefly described in order to understand this aspect.

Figure 8A:
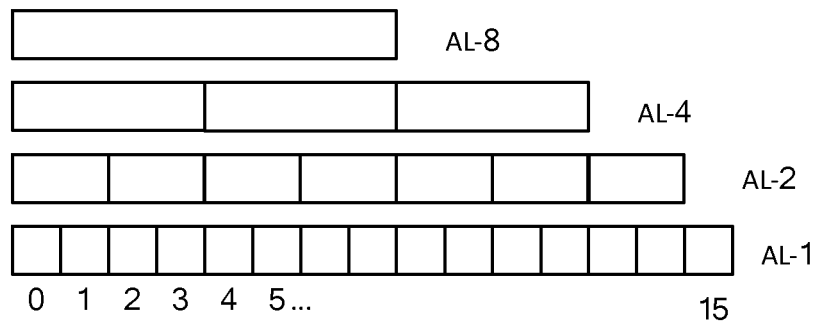
FIG. 8a illustrates different aggregation levels of Enhanced Control Channel Elements.

The symbols containing the EPDCCH are mapped to the resource elements in the enhanced control region. One EPDCCH can, depending on the information payload size, puncturing level, cyclic prefix, special subframe configuration in the case of Time division Duplex, TDD and the required level of channel coding protection, consist of 1, 2, 4, 8, 16 or 32 Enhanced Control Channel Clement, ECCEs, and the number is denoted as the ECCE aggregation level (AL). By choosing the aggregation level, link-adaptation of the EPDCCH is obtained. In total there are $N_{ECCE}$ ECCEs available for all the EPDCCH to be transmitted in the subframe, for a given EPDCCH set and the number $N_{CCE}$ varies from subframe to subframe depending on e.g. the number of legacy control symbols n. As $N_{ECCE}$ varies from subframe to subframe, the terminal needs to blindly determine the position and the number of ECCEs used for its EPDCCH which can be a computationally intensive decoding task. Therefore, some restrictions in the number of possible blind decodings a terminal needs to go through have been introduced. For instance, the ECCEs are numbered and ECCE aggregation levels of size R can only start on CCE numbers evenly divisible by R, see FIG. 8a disclosing ECCE aggregation levels (AL) 8, 4, 2 and 1.

The set of ECCE where a terminal needs to blindly decode and search for a valid EPDCCH are called search spaces. This is the set of ECCEs on a AL a terminal should monitor for scheduling assignments or other control information. In each subframe and for each AL, a terminal will attempt to decode all the EPDCCHs that can be formed from the ECCEs in its search space. If the CRC checks, then the content of the EPDCCH is assumed to be valid for the terminal and it further processes the received information. Often two or more terminals will have overlapping search spaces and the network has to select one of them for scheduling of the control channel. When this happens, the non-scheduled terminal is said to be blocked. The search spaces vary pseudo-randomly from subframe to subframe to minimize this blocking probability.

A search space is further divided to a common and a terminal specific part. In the common search space, not yet supported on EPDCCH (only on PDCCH) but being discussed for Rel-12, the EPDCCH containing information to all or a group of terminals is transmitted (paging, system information etc). If carrier aggregation is used, a terminal will find the common search space present on the primary component carrier (PCC) only. The common search space on PDCCH is restricted to aggregation levels 4 and 8 to give sufficient channel code protection for all terminals in the cell (since it is a broadcast channel, link adaptation cannot be used since different UE:s may have different link qualities). The $m_8$ and $m_4$ first PDCCH (with lowest CCE number) with an AL of 8 or 4 respectively belongs to the common search space. For efficient use of the CCEs in the system, the remaining search space is terminal specific at each aggregation level.

Figure 8B:
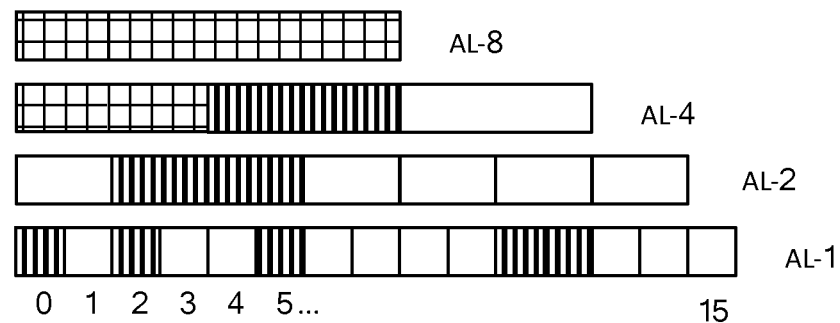
FIG. 8b is an exemplifying sketch of the Enhanced Physical Downlink Control Channel showing the search space a certain terminal needs to monitor for different aggregation levels.

FIG. 8*b* is an exemplifying sketch for PDCCH showing the search space (striped) a certain terminal needs to monitor. In total there are $N_{CCE}=15$ CCEs in this example and the common search space is marked with checked pattern.

An example of how the proposed technique may be implemented using different search spaces, is that if the UE of type B receives a DCI message within the common search space, the UE should assume a bandwidth of system A and if the UE receives a DCI message within a UE specific search space it should assume a BW of system B. The inverse example is also a possible implementation. The given example would make it possible for the UE:s of type A and type B to share the common search space for all related messages.

If the different search spaces collide with the same candidate size but with different content it is understood that a certain search space would need to be prioritized by the UE, the teaching of the disclosure then gives that a certain search space is prioritized and above teaching applies for that search space that is prioritized.

According to a further aspect of this disclosure, the step of configuring S2 the properties of at least one downlink control message comprises letting use of different antenna ports for transmission of the at least one downlink control message, represent different transmission bandwidths. In a MIMO system each antenna port typically corresponds to a reference signal, which is detected by the receiver in order to demodulate signals transmitted by the different antenna ports.

Then, the bandwidth of the system is represented by the antenna port or set of antenna ports on which the UE receives the DCI message. For example, when receiving messages in a localized search space, the system bandwidth is assumed to correspond to system A if port 7 is used and to correspond to system B if any other port is used.

According to a further aspect of this disclosure, it relates to a computer program, comprising computer readable code which, when run on a wireless network node in a cellular communication system, causes the node to perform the method describes above and below.

According to a further aspect of this disclosure, it relates to a computer program, comprising computer readable code which, when run on a wireless device in a cellular communication system, causes the wireless device to perform the method describes above and below.

Figure 9:
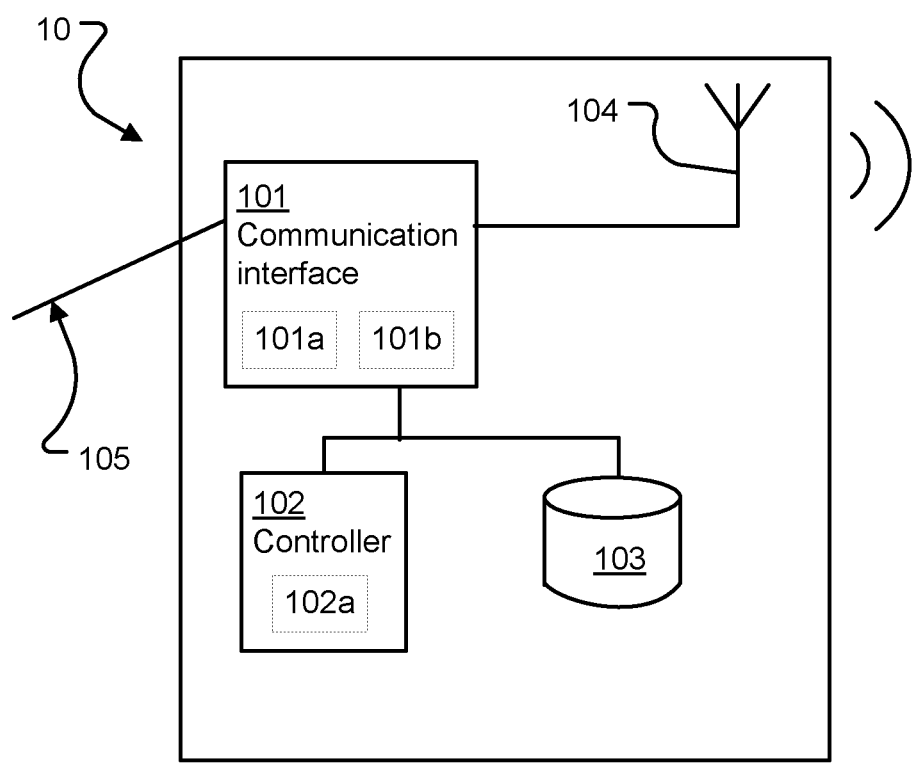
FIG. 9 illustrates an exemplifying block diagram of a wireless network node.

Turning now to FIG. 9, a schematic diagram illustrating some modules of an exemplary embodiment of a wireless network node 10 will be described. The radio network node 10 may be implemented as an Evolved Node B (eNB or eNodeB) or relay in LTE. The radio network node 10 comprises a network communication interface 101, a controller 102 and a memory 103. The wireless network node 10 is configured to transmit downlink control signalling in a cellular communication system, the wireless network node 10 operating over at least two different transmission bands having different transmission bandwidths.

The controller 102 or a processor that may be constituted by any suitable Central Processing Unit, CPU, microcontroller, Digital Signal Processor, DSP, etc. The controller is configured to configure the properties of at least one downlink control message, to represent one of the at least two different transmission bandwidths. Hence, the controller comprises a configuration unit 102*a* configured to configure the properties of at least one downlink control message, to represent one of the at least two different transmission bandwidths.

According to one aspect of the disclosure, the controller is a processor capable of executing computer program code. The computer program may be stored in a memory 103. The memory 103 can be any combination of a Read And write Memory, RAM, and a Read Only Memory, ROM. The memory 103 may also comprise persistent storage, which, for example, can be any single one or combination of magnetic memory, optical memory, or solid state memory or even remotely mounted memory.

As an alternative the steps, functions, procedures and/or blocks described above may as an alternative, be implemented in completely or partly in hardware using any conventional technology, such as discrete circuit or integrated circuit technology, including both general-purpose electronic circuitry and application-specific circuitry. The memory and the processor are then replaced by corresponding hardware blocks.

The communication interface 101 is arranged for wireless communication with other devices or nodes, such as the wireless device. The communication interface 101 comprises means for wireless 104 and/or wired 105 communication. The communication interface 101 is adapted to provide information about at least one of the available transmission bandwidths to wireless devices 20 in the cellular communication system and transmit the at least one downlink control message to at least one wireless device 20 in the cellular communication system as described above.

Hence, the communication interface comprises a transmitter 101*a* configured to transmit information about at least one of the available transmission bandwidths to wireless devices 20 in the cellular communication system. According to one aspect, the at least two different transmission bandwidths are at least partly overlapping in the frequency domain. The communication interface further comprises a transmitter 101*b* configured to transmit the at least one downlink control message to at least one wireless device 20 in the cellular communication system.

The wireless network node is further configured to perform all the methods in a network node as described above.

According to one aspect communication interface 101 is configured to operate simultaneously over the at least two different transmission bandwidths.

According to one aspect the communication interface 101 provides at least one search space for control signalling, which is common for the at least two transmission bandwidths.

According to one aspect the configuration unit 102a is configured to configure the at least one downlink control message to represent the transmission bandwidth used for encoding the at least one downlink control message.

According to one aspect the configuration unit 102a is configured to configure the properties of the at least one downlink control message comprises, using different wireless device identifiers for configuring the at least one downlink control message for the different transmission bandwidths.

According to one aspect, the wireless device identifiers are Radio Network Temporary Identifiers.

According to one aspect the configuration unit 102a is configured to configure the properties of at least one downlink control message comprises, using different message formats of the at least one downlink control message for the different transmission bandwidths.

According to one aspect the configuration unit 102a is configured to configure the properties of at least one downlink control message comprises using different resource mappings for the at least one downlink control message for the different transmission bandwidths.

According to one aspect the configuration unit 102a is configured to configure the properties of at least one downlink control message comprises using different antenna ports for transmission of the at least one downlink control message for the different transmission bandwidths.

Figure 10:
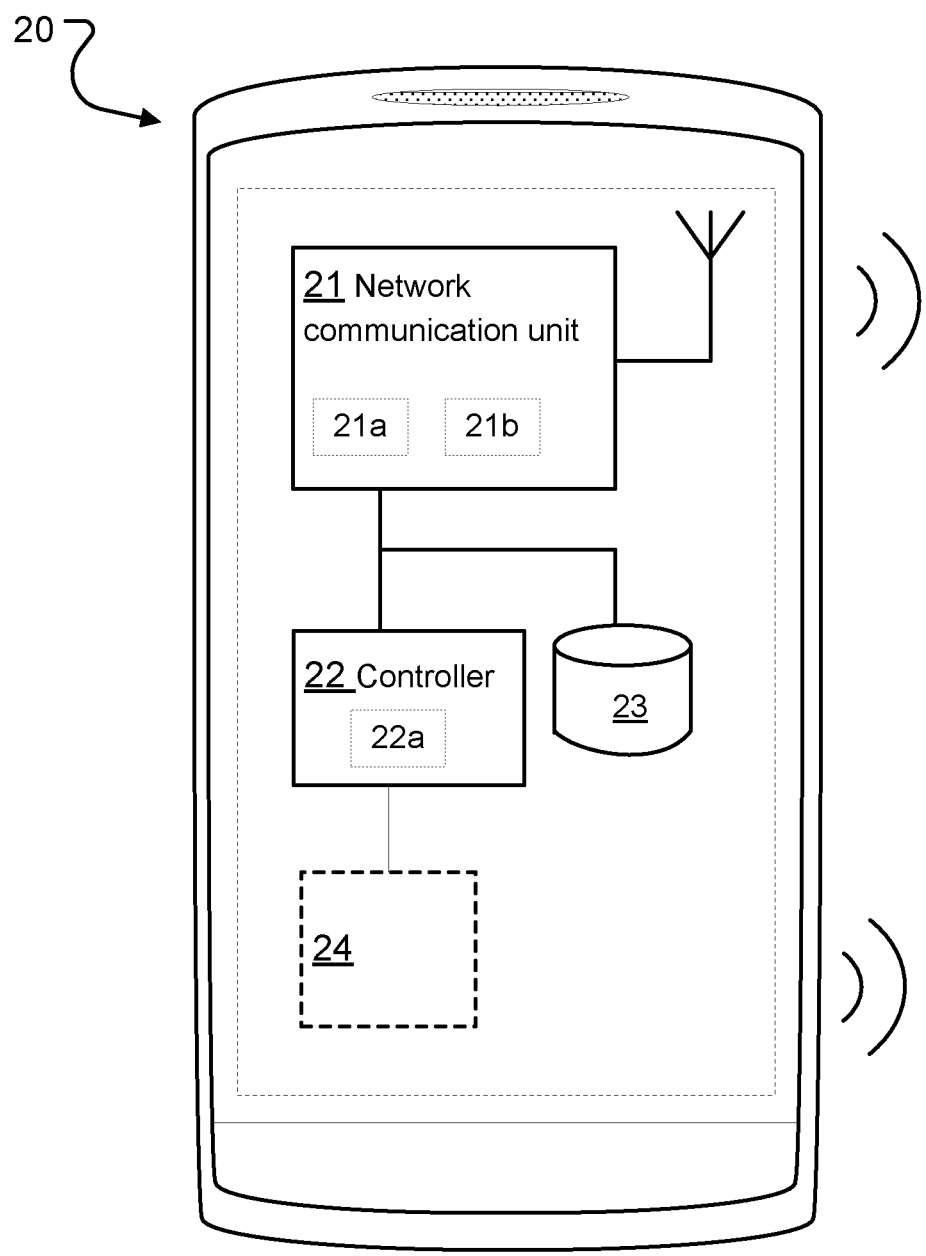
FIG. 10 illustrates an exemplifying block diagram of a wireless device.

Turning now to FIG. 10 a schematic diagram illustrating some modules of an exemplary embodiment of the wireless device 20 will be described. The wireless device could be any user equipment capable of communicating with a mobile communication network. The wireless device is configured to receive downlink control signalling, the wireless device being configured to operate in a geographical area of a cellular communication system, where an access point is providing at least two different transmission bands having different transmission bandwidths.

The wireless device 20 comprises a controller or a processor 22 that may be constituted by any suitable Central Processing Unit, CPU, microcontroller, Digital Signal Processor, DSP, etc. The controller is configured to determine, based on properties of the at least one received downlink control message, which one of the available transmission bandwidths is represented by the at least one downlink control message. Hence, the controller comprises a determiner 22a configured to determine, based on properties of the at least one received downlink control message, which one of the available transmission bandwidths is represented by the at least one downlink control message.

According to one aspect of this disclosure, the controller 22 is capable of executing computer program code. The computer program may be stored in a memory 23. The memory 23 can be any combination of a Read And write Memory, RAM, and a Read Only Memory, ROM. The memory 123 may also comprise persistent storage, which, for example, can be any single one or combination of magnetic memory, optical memory, or solid state memory or even remotely mounted memory.

As an alternative the steps, functions, procedures and/or blocks described above may as an alternative, be implemented in completely or partly in hardware using any conventional technology, such as discrete circuit or integrated circuit technology, including both general-purpose electronic circuitry and application-specific circuitry. The memory and the processor are then replaced by corresponding hardware blocks.

The wireless device 20 further comprises a network communication unit or a communication interface 21 arranged for wireless communication with other devices or nodes, such as the wireless network node 10.

The network communication unit 21, configured to retrieve information about the transmission bandwidths 201, 202 in the cellular communication system and receive at least one downlink control message from the cellular communication system as described above. Hence, the network communication unit comprises a retriever 21a, configured to retrieve information about the transmission bandwidths 201, 202 in the cellular communication system. It further comprises a receiver 21b configured to receive at least one downlink control message from the cellular communication system.

The wireless device 20 is further configured to perform all the methods in a wireless device as described above.

Hence, according to one aspect, the wireless device 20 further comprises a decoder 24 configured to decoding the downlink control message assuming the determined bandwidth.

According to one aspect, the network communication unit 21 is further configured to use the determined transmission bandwidth when sending a signal or message triggered by the downlink control message.

According to one aspect, the determiner 22a is configured to determine the bandwidth based on the message formats of the downlink control message, wherein different message formats represent different transmission bandwidths.

According to one aspect, the determiner 22a is configured to determine the bandwidth, based the wireless device identifier being used for configuring the properties of the at least one downlink control message, wherein different wireless device identifiers represent different transmission bandwidths.

According to one aspect, the determiner 22a is configured to determine the bandwidth, based on different scheduling of the downlink control message, wherein different wireless device identifiers represent different transmission bandwidths.

According to one aspect, the determiner 22a is configured to determine the bandwidth based on detection of the antenna ports being used for transmission of the at least one downlink control message, wherein different antenna ports represent different transmission bandwidths.

The invention claimed is:

1. A method in a wireless network node of a cellular communication system for transmitting downlink control signalling to at least one wireless device, the wireless network node operating over at least two different transmission bandwidths, the method comprising:

transmitting, to wireless devices in the cellular communication system, information about mapping of downlink control messages to different time-frequency resource allocations based on different transmission bandwidths;

configuring properties of a downlink control message to represent one of the at least two different transmission bandwidths, such that a time-frequency resource allocation used for the downlink control message is indicative of a respective transmission bandwidth, wherein a first time-frequency resource indicates a first transmission bandwidth and wherein a second time-frequency resource indicates a second transmission bandwidth different from the first transmission bandwidth; and transmitting the downlink control message to the at least one wireless device in the cellular communication system, wherein the step of configuring comprises mapping the downlink control message to time-frequency resources based on different transmission bandwidths according to the mapping information.

2. The method according to claim 1, wherein the at least two different transmission bandwidths are at least partly overlapping in the frequency domain.

3. The method according to claim 1, wherein the wireless network node is configured to operate simultaneously over the at least two different transmission bandwidths.

4. The method according to claim 1, wherein the wireless network node provides at least one search space for control signalling, which is common for the at least two different transmission bandwidths.

5. The method according to claim 1, wherein the downlink control message is configured to represent the transmission bandwidth used for encoding the downlink control message.

6. The method according to claim 1, wherein the step of configuring the properties of the downlink control message comprises using different wireless device identifiers for configuring the downlink control message for the at least two different transmission bandwidths.

7. The method according to claim 6, wherein the wireless device identifiers are Radio Network Temporary Identifiers.

8. The method according to claim 1, wherein the step of configuring the properties of the downlink control message comprises using different message formats of the downlink control message for the at least two different transmission bandwidths.

9. The method according to claim 1, wherein the step of configuring the properties of the downlink control message comprises using different resource allocations for the downlink control message for the at least two different transmission bandwidths.

10. The method according to claim 1, wherein the step of configuring the properties of the downlink control message comprises using different antenna ports for transmission of the downlink control message for the at least two different transmission bandwidths in a Long Term Evolution, LTE, communications network.

11. The method of claim 1 wherein mapping of downlink control messages to different time-frequency resource allocations comprises mapping of downlink control messages to different antenna ports or sets of antenna ports in a Long Term Evolution, LTE, communications network.

12. A wireless network node being configured to transmit downlink control signalling to at least one wireless device in a cellular communication system, the wireless network node operating over at least two different transmission bandwidths, wherein the wireless network node comprises:

a processing circuit configured to configure the properties of a downlink control message, to represent one of the at least two different transmission bandwidths, wherein the step of configuring comprises mapping the downlink control message to time-frequency resources according to information about mapping of downlink control messages to different time-frequency resource allocations based on available transmission bandwidths such that a time-frequency resource allocation used for the downlink control message is indicative of a respective transmission bandwidth, wherein a first time-frequency resource indicates a first transmission bandwidth and wherein a second time-frequency resource indicates a second transmission bandwidth different from the first transmission bandwidth; and a communication unit, adapted to transmit the information about mapping of downlink control messages to different time-frequency resource allocations based on available transmission bandwidths to wireless devices in the cellular communication system and to transmit the downlink control message to the at least one wireless device.

13. The wireless network node of claim 12 wherein mapping of downlink control messages to different time-frequency resource allocations comprises mapping of downlink control messages to different antenna ports or sets of antenna ports in a Long Term Evolution, LTE, communications network.

14. A method in a wireless device for receiving downlink control signalling in a cellular communication system, the method comprising:

retrieving information about mapping of downlink control messages to different time-frequency resource allocations based on different transmission bandwidths in the cellular communication system such that a time-frequency resource allocation used for a downlink control message is indicative of a respective transmission bandwidth, wherein a first time-frequency resource indicates a first transmission bandwidth and wherein a second time-frequency resource indicates a second transmission bandwidth different from the first transmission bandwidth;

receiving a downlink control message from the cellular communication system; and determining, based on the information about mapping and a time-frequency resource used by the received downlink control message, which of the different transmission bandwidths is represented by the downlink control message.

15. The method according to claim 14, wherein the available transmission bandwidths are at least partly overlapping in the frequency domain.

16. The method according to claim 14, further comprising the step:

decoding the downlink control message assuming the determined bandwidth.

17. The method according to claim 14, further comprising the step:

using the determined transmission bandwidth when sending a signal or message triggered by the downlink control message.

18. The method according to claim 14, wherein different message formats of the downlink control message represent different transmission bandwidths.

19. The method according to claim 14, wherein different wireless device identifiers being used for configuring the properties of the downlink control message represent different transmission bandwidths.

20. The method according to claim 14, wherein different scheduling of the downlink control message represent different transmission bandwidths.

21. The method of claim 14 wherein the time-frequency resource used by the received downlink control message comprises an antenna port or a set of antenna ports in a Long Term Evolution, LTE, communications network.

22. A wireless device being configured to receive downlink control signalling in a cellular communication system, comprising:

a network communication unit, configured to retrieve information about mapping of downlink control messages to different time-frequency resource allocations based on different transmission bandwidths available in the cellular communication system such that a time-frequency resource allocation used for a downlink control message is indicative of a respective transmission bandwidth, wherein a first time-frequency resource indicates a first transmission bandwidth and wherein a second time-frequency resource indicates a second transmission bandwidth different from the first transmission bandwidth, and to receive a downlink control message from the cellular communication system;

a processing circuitry configured to determine, based on the information about mapping and a time-frequency resource used by the received downlink control message, which one of the different transmission bandwidths is represented by the downlink control message.

23. The wireless device of claim 22 wherein the time-frequency resource used by the received downlink control message comprises an antenna port or a set of antenna ports in a Long Term Evolution, LTE, communications network.

\* \* \* \* \*